July 22, 1941.        G. E. PORTER        2,250,033
BRAKE OPERATING MECHANISM
Filed June 21, 1940        2 Sheets-Sheet 1
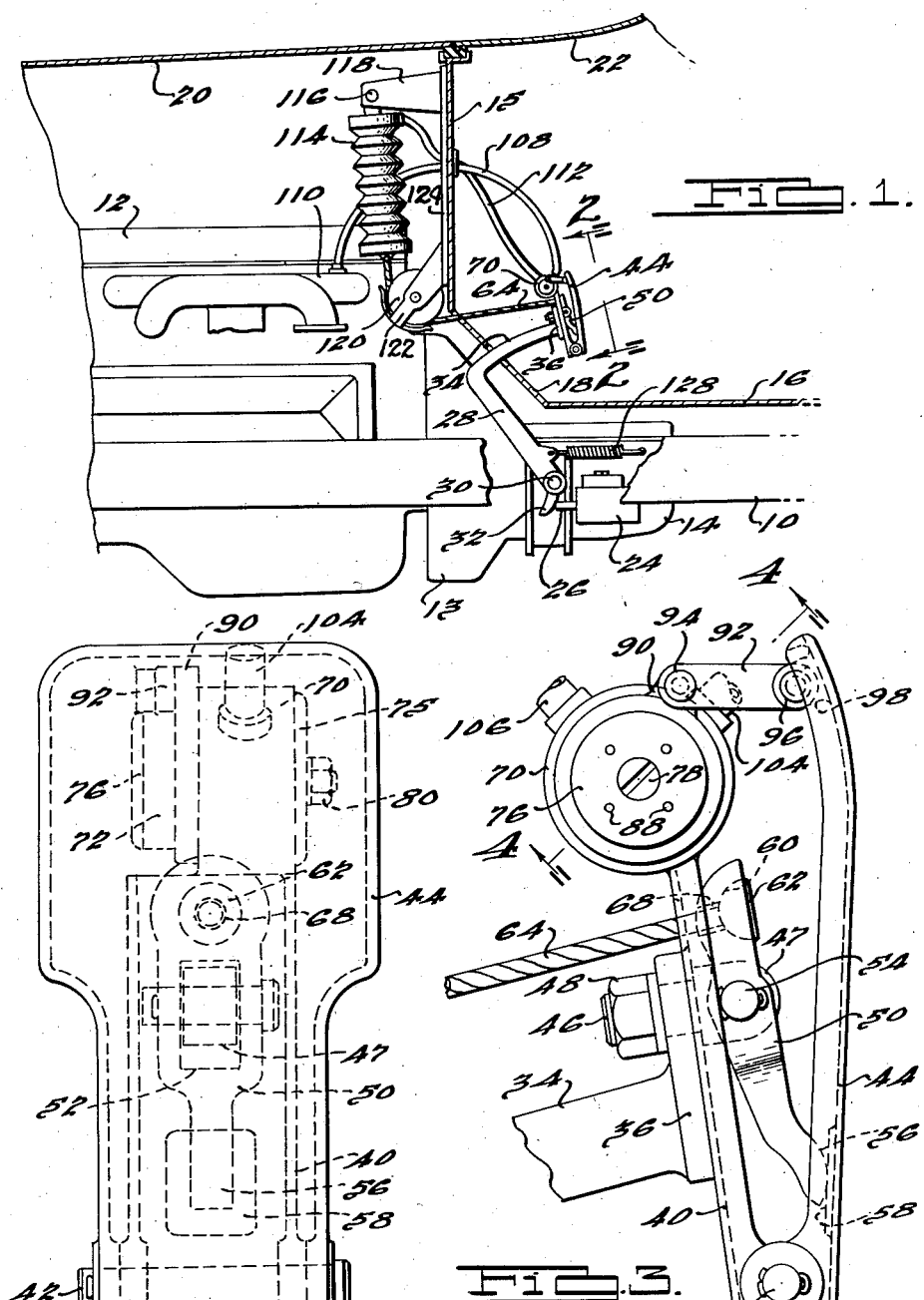
INVENTOR
Gilbert E. Porter
BY
Harness, Dickey & Pierce
ATTORNEYS.

July 22, 1941.        G. E. PORTER        2,250,033
BRAKE OPERATING MECHANISM
Filed June 21, 1940        2 Sheets-Sheet 2

INVENTOR
Gilbert E. Porter.
BY
Harness, Dickey & Pierce
ATTORNEYS.

Patented July 22, 1941

2,250,033

UNITED STATES PATENT OFFICE 2,250,033

BRAKE OPERATING MECHANISM

Gilbert E. Porter, Mount Clemens, Mich.

Application June 21, 1940, Serial No. 341,599

12 Claims. (Cl. 188—152)

This invention relates to brake actuating mechanism and particularly to that type thereof employing pressure operated means to assist in the application of the brakes and commonly known as brake "boosters," the principal object being the provision of a device of this type that is simple in construction, efficient in operation and economical to manufacture.

Objects of the invention include the provision of a vehicle brake booster mechanism that may be applied to existing vehicle constructions with a minimum of time and effort; the provision of a pressure operated booster mechanism for vehicle brakes including a control element that is simply and readily secured to the brake pedal of a conventional motor vehicle; the provision of a booster mechanism for vehicle brakes including a control pedal, control valve and reaction means arranged as a unit and applicable as such to the brake pedal of an automotive vehicle; the provision of a device of the type described including a novel reaction means so constructed and arranged as to give the operator of the vehicle a feel of the intensity of the brake application; and the provision of a device of the type described that is applicable for use equally well whether the source of power for actuating the same is a positive pressure or sub-atmospheric pressure.

The above being among the objects of the present invention, the same consists in certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views, Fig. 1 is a fragmentary, partially broken, partially sectioned side elevational view of a portion of a motor vehicle including the brake control mechanism therefor, showing a suitable embodiment of the present invention associated therewith;

Fig. 2 is an enlarged face elevational view of the control unit applied to the brake pedal in Fig. 1 and taken in the direction of the arrows 2—2 of Fig. 1;

Fig. 3 is a side elevational view of the control unit shown in Fig. 2 and illustrating a portion of the brake pedal associated therewith;

Figure 4:
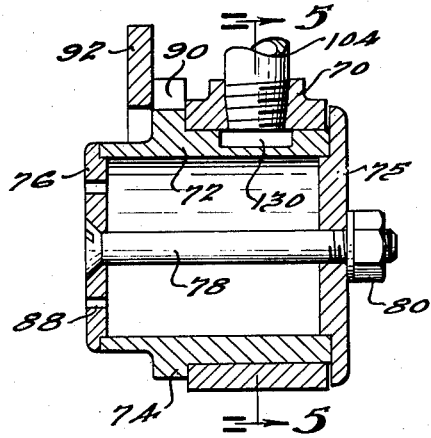
Fig. 4 is an enlarged, fragmentary, sectional view taken axially through the valve shown in Fig. 3 as on the line 4—4 thereof.

The present invention relates to that class of devices commonly known as brake boosters for automotive vehicles. It is of that type particularly intended for application to existing forms of manually operated vehicle brake mechanisms without requiring any changes in design thereof to accommodate the booster mechanism. It includes a power element operated by a gaseous medium under pressure and for that purpose may employ air, for instance, under a positive pressure, or may employ sub-atmospheric pressure, for the purpose of actuating the power element.

In the past such devices have been more or less complicated and particularly have involved a considerable amount of labor in the application of the same to a motor vehicle, with the result that the cost of the device itself plus the cost of installation has resulted in the total cost price to the owner too great to enable many vehicle owners to realize the benefits thereof. In my prior application for Letters Patent of the United States for improvements in Control mechanism, filed April 17, 1939, and serially numbered 268,218, now Patent No. 2,207,700 dated July 16, 1940, I have illustrated a construction in which many of the disadvantages of the prior constructions have been eliminated and in which the cost of installation has been reduced as compared to prior constructions. However, in my prior construction above identified, a bellows is employed between the brake pedal pad and the floor board, the main disadvantage of which is that the presence of such bellows restricts the otherwise total available movement of the brake pedal and renders it unsuitable for use in connection with certain makes of motor vehicles having an unusually short pedal stroke.

In accordance with the present invention, the same ease of installation as in my previous construction is retained but the bellows or other power element, instead of being placed between the brake pedal pad and floor board, may be located within the engine compartment or in any other suitable or convenient location, out of interfering relation with respect to the travel of the brake pedal whereby to permit the fully intended movement thereof. Additionally, the present invention incorporates in it a control element including a control pedal, valve mechanism and a reaction means, the effect of which on the control pedal varies with the intensity of brake application, and which control element is applicable to and removable from the brake pedal as a unit preferably through the intermediary of a single bolt. It, therefore, provides a construction which may be applied to or removed from a motor vehicle with a minimum of time and effort, thereby reducing the installation charges required for applying the same to a motor vehicle to a minimum. Furthermore, the device itself is extremely simple in construction and, therefore, economical to manufacture, permitting it to be sold to a vehicle owner and to be installed for him at a minimum total price, thus rendering it available to many vehicle owners financially unable to purchase the more expensive types heretofore offered.

Referring now to the accompanying drawings and particularly to Fig. 1 thereof a motor vehicle is illustrated as having a frame 10 upon which is mounted a conventional power plant or unit including an internal combustion engine 12, clutch 13 and transmission 14, a dash 15, a floor 16, and a toe board 18 connecting the floor 16 to the dash 15. The usual hood 20 covers the engine 12 and the usual cowl 22 extends rearwardly therefrom from the periphery of the dash 14.

Although the present invention is equally applicable to vehicles having purely mechanical brakes or to those having hydraulic brakes, for purposes of illustration the particular vehicle shown is considered as having a hydraulic braking system including a master cylinder 24 of conventional construction suitably mounted upon the frame 10 or upon the power plant 12. It is shown as provided with a plunger 26 adapted to be pressed inwardly in the application of the brakes. In order to actuate the plunger 26, a brake pedal 28 may be suitably mounted upon the frame 10 as by means of the shaft 30 and is provided with a downwardly projecting finger 32 below the shaft 30 which is adapted to bear against the forward end of the plunger 26 and press it inwardly upon depression of the pedal 28 to effect actuation of the vehicle brake system (not shown). The pedal 28 comprises a main part projecting radially with respect to the shaft 30 and a conventionally rearwardly curved upper end portion 34 which projects through a suitable opening in the toe board 18 and terminates at its free end in the usual pedal pad 36 normally intended to receive the operator's foot thereon.

In accordance with the present invention, there is mounted upon the pedal pad 36 a plate-like base member 40, the lower end of which is pivotally connected by means of a horizontally extending pin 42 to the lower end of the upwardly extending control pedal 44. The base 40 is secured to the pad 36 by means of a bolt 46, the head of which engages the upper or right-hand face of the base 40, as viewed in Fig. 3, and which bolt projects through both the base 40 and pad 36 and receives the nut 48 thereon below the pad 36 and thus serves to clamp the base 40 securely to the face of the pad 36. It will be noted that only one bolt 46 is required for this purpose. The head 47 of the bolt 46 is flattened on opposite sides, as indicated in Fig. 2, and a double armed lever 50, provided with a central opening 52 therein, as indicated in Fig. 2, is positioned over the head 47 with the head 47 received in the opening 52 and is pivoted thereto by means of a pin 54. The lower arm of the lever 50 is the longest and is provided with a curved end 56 which is adapted to bear against a wear plate 58 formed on the inner face of the control pedal 44 intermediate the pins 42 and 54. The opposite or upwardly extending arm of the lever 50 is relatively short and is provided with a partially spherical seat 60 in its righthand face, as viewed in Fig. 3. Seated in the recess 60 is a partially spherical member 62 which is fixed to one end of a flexible cable 64 which extends through an opening 68 in the upper arm of the lever 50 centrally of the pocket 60.

Figure 5:
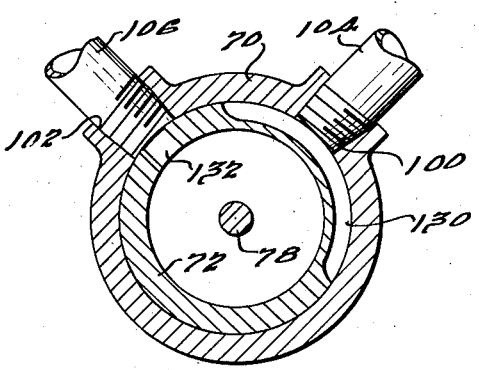
Fig. 5 is a transverse sectional view taken on the line 5—5 of Fig. 4 and illustrating the valve in closed position.
Figure 6:
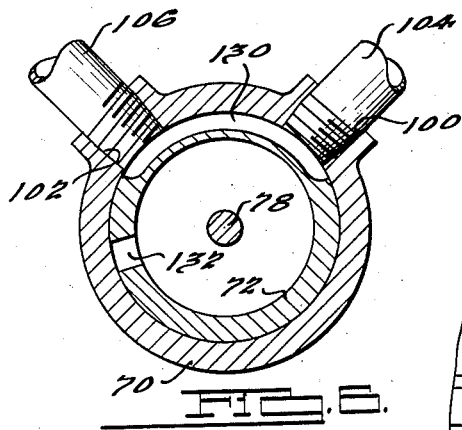
Fig. 6 is a view similar to Fig. 5 but illustrating the valve in open position.

Formed on the upper end of the base 40 is the casing of a suitable valve mechanism, the movable element of which is suitably connected to the free end of the control pedal 44 so that relative movement between the control pedal 44 and the base will effect actuation of the valve mechanism. The particular valve mechanism shown by way of illustration comprises, as best shown in Figs. 4, 5 and 6, a ring-like body 70 preferably formed integrally with the body 40 or fixed with respect thereto and arranged with its axis parallel to the axis of the pin 42. The interior of the ring member 70 is cylindrical and receives therein the external surface of a sleeve member 72 which is formed to provide an annular flange 74 which provides an axial shoulder which abuts against one end of the ring member 70. A removable end member or cap 75 piloted within one end of the sleeve 72 is adapted to close such end. The opposite end of the sleeve 72 is closed by an end member or cap 76 piloted therein, and a bolt 78 extending between the caps 75 and 76, together with a nut 80, serves to maintain the two caps 75 and 76 in operative position in the ends of the sleeve 72. One or both of the ends or caps 75 and 76 may be provided with apertures such as 88 therein for the purpose of permitting the flow of air between the interior and the exterior of the sleeve 72.

The flange 74 is provided with a radially projecting lug 90 to one end of which a link 92 is pivoted by means of a pin 94, the opposite end of the link being pivoted by means of a pin 96 to a lug 98 formed on the inner face of the control pedal 44 adjacent its free end. As will be appreciated from an inspection of Fig. 3, if the upper end of the control pedal 44 is depressed, such movement thereof acting through the link 92 will cause the sleeve 72 to be rotated about the axis of the member 70.

Referring now to Figs. 5 and 6 in particular, it will be noted that the ring member 70 is provided with a pair of angularly spaced radially directed openings 100 and 102 therethrough, the opening 100 provided with a connection 104 and the opening 102 being provided with a connection 106, each of which connections is adapted to be sealed to a flexible connection extending to a source of power and to a power element respectively, as will hereinafter be more fully explained. Such source of power may be either a source of sub-atmospheric pressure or a source of positive pressure, and in the first-mentioned instance the power element may be either of the bellows or of the piston and cylinder type and in the latter instance a piston and cylinder.

As a matter of illustration only, in the construction illustrated in Figs. 1 to 6, inclusive, it will be assumed that the source of power employed is a source of sub-atmospheric pressure such as the intake manifold 110 of the engine 12. Accordingly, a flexible tube 108 as illustrated in Fig. 1 connects the connection 104 with the intake manifold 110 of the power plant 12. The connection 106 is connected by a flexible tube 112 with a collapsible and expansible bellows 114. The bellows 114 may be of any suitable construction, but is preferably of a reinforced rubber construction or the like. While it may be supported in any suitable position, enabling it to be connected to the cable 64 and to actuate the same, in the particular installation illustrated in Fig. 1, the bellows 114 is arranged with its axis approximately vertical and as having its upper head pivotally connected by means of a pin 116 with a bracket 118 fixed to the forward face of the dash 15. The cable 64, at that end thereof opposite the control unit on the brake pedal, is fastened to the lower head of the bellows 114. For the purpose of rendering this connection operative, the cable 64 passes under a sheave or pulley 120 supported between the opposite arms of a bracket 122 fixed to the forward face of the dash 15. Both brackets 118 and 122 are provided with a common base 124 which is secured directly to the dash 15 and by such securement fixes both brackets relative to the dash 15. By this construction the base 124 with its brackets 118 and 122, the pulley 120 and bellows 114 forms a unitary assemblage securable as such to the dash 15, thus aiding in facilitating the application of the booster brake mechanism to a motor vehicle.

A coil spring 128 constantly urges the brake pedal 28 in a clockwise direction of rotation about the shaft 30 towards brake released position, and the pedal in moving in this direction acts through the cable 64 to extend the bellows 114 and at the same time, due to the resistance of the bellows to elongate, the pull on the cable 64 in being transmitted through the lever 50, tends to turn the lever 50 in a counterclockwise direction of rotation, as viewed in Figs. 1 and 3, about the pivot 54, the lower arm of the lever 50 acting against the control pedal 44 to move it away from the base 40 in a clockwise direction of rotation about the pin 42, thus moving it to its inoperative position shown in Fig. 3.

Referring now to Figs. 5 and 6, it will be noted that the sleeve 72 is provided in its periphery with a circumferentially directed groove or channel 130 which is in open communication with the interior of the connection 104 in all normal positions of rotation of the sleeve 72. The sleeve 72 is also provided with an opening 132 extending radially therethrough. When the control pedal 44 is in its released position, indicated in Fig. 3, the inter-connection between the pedal 44 and the sleeve 72 moves the sleeve 72 to its inoperative position indicated in Fig. 5. It will be noted that the channel 130 is in open communication with the interior of the connection 104 during all normal phases of operative movement of the sleeve 72 and consequently is in open communication through the tube 108 with the interior of intake manifold 110 which is under a partial vacuum during operation of the engine. However, when the control pedal 44 is in inoperative or brake released position, the channel 130 is out of registry with the connection 106, but the opening 132 is in registry with the connection 106. The interior of the sleeve 72 being in open communication with the atmosphere through the openings 88, atmospheric pressure is thus transmitted through the opening 132 and through the connection 106 and flexible tube 112 to the interior of the bellows 114.

When the control pedal 44 is depressed and caused to rotate in the counterclockwise direction about the pin 42 toward the base 40, such movement causes the sleeve 72 to turn in a counterclockwise direction of rotation from the position indicated in Fig. 5, first moving the opening 132 out of registry with the connection 106 and then bringing the channel 130 into registry with both the connections 104 and 106, as indicated in Fig. 6. It will be appreciated that as soon as the opening 132 is brought out of registry with the connection 106, the interior of the bellows 114 is cut off from communication with the atmosphere, and that as soon as the channel 130 is brought into registry with the connection 106, the interior of the bellows is communicated through the tube 112, connection 106, channel 130, connection 104 and flexible tube 108 with the interior of the intake manifold and the partial vacuum existing therein, such partial vacuum partially evacuating the bellows 114, thus pulling up the associated end of the cable 64 and drawing the opposite end of the cable 64 attached to the pedal pad 36 forwardly toward its brake applying position. If now it is desired to release the brake, the operator simply removes his foot from the control pedal 44, upon which the pull exerted by the bellows 114 through the cable 64 on the double arm lever 50 will move the control pedal 44 in a clockwise direction of rotation about its pivot 42, as viewed in Fig. 3, and thus return the sleeve 72 from the position indicated in Fig. 6 to the position indicated in Fig. 5, upon which air will flow into the bellows 114 to displace the partial vacuum therein and the spring 128 will be allowed to return the brake pedal 28 to brake released position.

It will be appreciated that with the above described construction if the operator presses the control pedal 44 downwardly a sufficient amount to move the sleeve 72 from the position indicated in Fig. 5 to the position indicated in Fig. 6 and then holds his foot against further downward movement, the pedal 28 in moving toward brake applying position will carry the base 40 therewith and, consequently, the latter will move away from the control pedal 44 and cause the sleeve 72 to be rotated back to the position indicated in Fig. 5. Thus, the operator may cause the control pedal 44 to move the sleeve 72 to brake applying position and by limiting the amount which he causes the control pedal 44 to follow down the movement of the brake pedal, to obtain any degree of braking effect that he desires. This provides a follow-up action in the application of the brakes enabling the operator to obtain any desired degree of braking action desired or required during a braking operation.

An important feature of the present invention is in connection with the reaction on the control pedal 44 due to the pull on the brake pedal through the cable 64. It will be appreciated that all pull exerted by the bellows 44 through the cable 64 tending to rotate the brake pedal 28 and thus apply the brake of the vehicle, is exerted through the double armed lever 50, the base 40 and thence to the brake pedal 28. This pull, as viewed in Fig. 3, tends to rotate the double armed lever 50 in a counterclockwise direction of rotation and the lower or longer arm thereof bearing against the wear plate 58 of the control pedal 44 tends to rotate the control pedal 44 in a clockwise direction of rotation about its pivot pin 42, thereby tending to move the control pedal 44 toward a position in which sleeve 72 cuts off communication between the intake manifold 110 and the interior of the bellows 114. The force with which the double armed lever 50 thus reacts against the control pedal 44 tending to move it toward its inoperative position is directly proportional to the pull of the bellows 114 on the cable 64. Consequently, the harder the brakes are applied, the more pressure is required through the foot of the operator to maintain the control pedal 44 in a position to cause the channel 130 in the sleeve 72 to bridge the connections 104 and 106, or to maintain the sleeve 72 in a position in which the opening 132 is out of registry with the connection 106, the latter position being that required to hold the brakes applied without applying any further effort to increase the same. Thus the pressure required to be exerted through the foot of the operator on the control pedal 44 is directly proportional to the force applied to the braking system in any application of the brake, regardless of the intensity of the braking action, but at the same time only a fraction of the pressure which would otherwise be required if the brakes were applied solely by the pressure exerted by the operator's foot.

Thus by the provision of the assembly comprising the base 40, control pedal 44, lever 50 and the valve mechanism described which is securable to the pedal 16 by means of the single bolt 46, in conjunction with the suitably operated power element, such for instance as the bellows 114, a construction is provided in accordance with the present invention which has both a follow-up action and one in which the pressure exerted on the vehicle braking system is directly proportional to the force exerted through the foot of the operator. It, therefore, provides all of the desirable characteristics required in a device of this type and yet one which, because of its simplicity in construction and ease of installation, may be marketed at an unusually low price rendering it available to substantially all vehicle owners.

It will be appreciated that where the source of power is a gaseous medium under pressure, as for instance air under pressure, the invention may be readily adapted to employ the same simply by replacing the bellows 114 with a piston and cylinder and by introducing air under pressure through the flexible tube 108 to the required side of the piston without any change whatever in the control unit applied to the pedal. Such construction is illustrated in Fig. 7 in which it will be observed that the tube 108 instead of being extended to the intake manifold 110 of the power plant 12 is connected to a reservoir 133 for air under pressure, such air being furnished the reservoir 133 by a suitable compressor or the like (not shown) discharging through the tube 134 into the reservoir 133.

Figure 7:
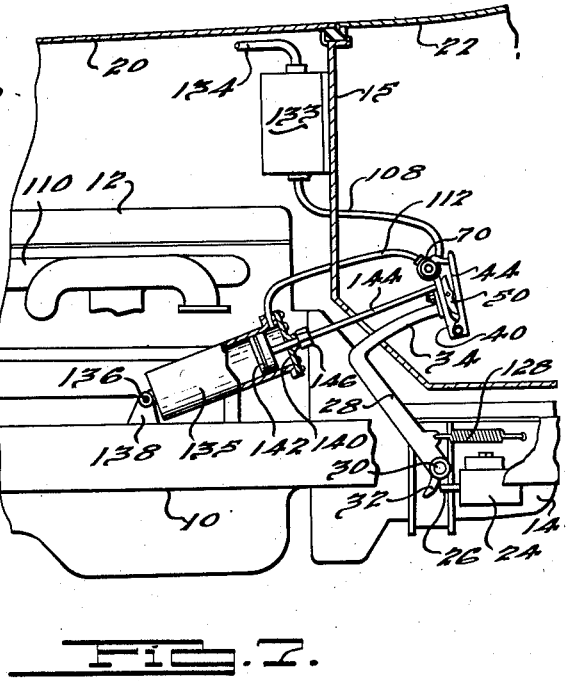
Fig. 7 is a view similar to Fig. 1 but illustrating a modified form of construction.

Instead of employing a bellows such as the bellows 114 in the construction illustrated in Fig. 7, a cylinder 135 is provided, one end thereof being pivoted as at 136 to a bracket 138 suitably fixed to the frame 10. The opposite end of the cylinder 135 is closed by a suitable head 140 and within the cylinder is a piston 142 having a rod 144 projecting through the head 140 and protected against leakage in its passage therethrough by means of a suitable packing gland 146. The rod 144 may be connected to the double arm lever 50 of the control mechanism in identically the same manner as the cable 64 previously described and as best brought out in Fig. 3. The tube 112 in this case is connected with the interior of the cylinder 135 between the piston 142 and the head 140, as indicated. All the rest of the parts are identical and function in the same manner as previously described, the only difference being that in this case when the control pedal 44 is depressed to first bring the opening 132 out of registry with the connection 106 and to bring the channel 130 into bridging relationship with both the connections 104 and 106, air under pressure will flow from the reservoir 133 into the cylinder 135 above the piston 142 and will cause the piston 142 to move forwardly and cause the brake pedal 28 to be moved toward brake applying position. If the operator does not cause his foot to follow down the movement of the control pedal 44 with the pedal 28, the pedal 28 will move to such an extent as will permit the sleeve 72 to rotate back towards inoperative position a sufficient amount to cut off the channel 130 from the connection 106 but without bringing the opening 132 into registry with the opening 106 thus holding the brakes applied in this position. The follow-up action in this respect is, therefore, identical to the follow-up action previously described in connection with the use of the bellows 114. Likewise, if the operator removes his foot from the control pedal 44 when the brakes are partially or wholly applied, the control pedal 44 in moving to inoperative position will turn the sleeve 72 to bring the port 132 in registry with the connection 106, upon which the air under pressure in the cylinder 135 will escape through the interior of the sleeve 72 to the atmosphere and the brakes will be released. Likewise, in this case, the pressure exerted by the piston 142 in moving the pedal 124 into brake applying position reacts through the double arm lever 50 against control pedal 44 to give the operator a feel of the intensity of the brake action on the vehicle in identically the same manner as in the construction previously described. In other words, it will be understood that the unit applied to the brake pedal is as readily adaptable for use in connection with a system employing a gaseous medium under positive pressure for a source of power as it is to a system employing a fluid under sub-atmospheric pressure.

Figure 8:
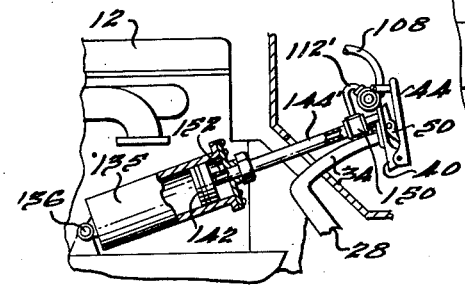
Fig. 8 is a fragmentary, partially broken, partially sectioned view illustrating a modification of the construction shown in Fig. 7.

In Fig. 8 a construction is shown which is identical to that shown in Fig. 7 except for the means employed to transfer fluid between the valve and the cylinder, and accordingly all identical parts are indicated by the same numerals as in Fig. 7 and no further description of the same is required. In Fig. 8 the piston rod 144', corresponding to the rod 144 of Fig. 7, is made hollow but closed at its opposite extremities. The tube 112' instead of extending from the valve to the cylinder 135 as in Fig. 7, is relatively short and connects with the hollow interior of the rod 144' through a connection 150 carried by the rod 144' immediately below the pedal pad and base 40. The lower or forward end of the rod 144' within the cylinder 135, is provided with an opening 152 therein connecting the hollow interior of the rod with the interior of the cylinder above the piston 142 thereof. Obviously this construction will function in exactly the same manner as the construction shown in Fig. 7, but the presence of one of the flexible tubes is substantially eliminated.

Formal changes may be made in the specific embodiment of the invention described without departing from the spirit and substance of the broad invention, the scope of which is commensurate with the appended claims.

What is claimed is:

1. In a motor vehicle, in combination, a pedal adapted to be depressed in the actuation of mechanism on said motor vehicle, a base fixed to said pedal, a control pedal movably mounted on said base, control valve mechanism interconnected between said control pedal and said base whereby to be operated during relative movement between said control pedal and said base, reaction means interposed between said base and said control pedal and operatively associated with said control pedal, a fluid power element, a connection between said fluid power element and said reaction means, and means connecting said valve mechanism with said power element and a source of power.

2. In a motor vehicle, in combination, a pedal adapted to be depressed in the actuation of mechanism on said motor vehicle, a base fixed to said pedal, a control pedal movably mounted on said base, control valve mechanism interconnected between said control pedal and said base whereby to be operated during relative movement betweeen said control pedal and said base, reaction means interposed between said base and said control pedal and operatively associated with said control pedal, a fluid power element, a connection between said fluid power element and said reaction means, and means connecting said valve mechanism with said power element and a source of power, said base, control pedal, valve mechanism and reaction means forming a unitary assemblage applicable to and removable from said pedal as such.

3. In a motor vehicle, in combination, a pivotally mounted pedal connected to a part of said vehicle for actuation thereof upon depression of said pedal, a fluid pressure power operated element having one end thereof secured against relative axial movement to said vehicle, a source of power therefor, and a unit applicable to and removable as such from said pedal comprising a base secured to said pedal, a control pedal movably mounted on said base for movement toward and away therefrom, valve mechanism operatively interconnected between said base and said control pedal for inter-related movement with said control pedal, and a movable member interposed between said base and said control pedal and bearing against said control pedal; said movable member being connected to said power element and being so constructed and arranged that the pull exerted thereon by said power element tends to move said movable member in a direction to urge said control pedal away from said base, and means connecting said valve mechanism with said power element and with said source of power.

4. In a motor vehicle, in combination, a pivotally mounted pedal connected to a part of said vehicle for actuation thereof upon depression of said pedal, a fluid pressure power operated element having one end thereof secured against relative axial movement to said vehicle, a source of power therefor, and a unit applicable to and removable as such from said pedal comprising a base secured to said pedal, a control pedal movably mounted on said base for movement toward and away therefrom, valve mechanism operatively interconnected between said base and said control pedal for inter-related movement with said control pedal, and a member interposed between said base and said control pedal and mounted between its ends for pivotal movement, one end of said member adapted to bear against said control pedal, and means inter-connecting the other end of said movable member with said power element, and operative connections between said valve mechanism and said power element and said source of power.

5. In combination with a control pedal of a motor vehicle, a base fixed with respect to said pedal, a control pedal pivotally mounted upon said base, valve mechanism interposed between said base and said control pedal connected to both thereof for receiving operative movement therefrom during relative movement between said control pedal and said base, and means interposed between said base and said control pedal operable when moved in one direction to urge said control pedal away from said base, and means for connecting said member to a power element whereby the pull of said power element on said member tends to move said movable member in said direction to move said control pedal away from said base.

6. In combination with a control pedal of a motor vehicle, a base fixed with respect to said pedal, a control pedal pivotally mounted upon said base, valve mechanism interposed between said base and said control pedal connected to both thereof for receiving operative movement therefrom during relative movement between said control pedal and said base, and a member pivotally mounted between its ends on said base and between said base and said control pedal, one end of said member bearing against said control pedal in spaced relation with respect to the pivotal axis thereof and the other end of said member being formed for connection to a power element.

7. In combination with a control pedal for a motor vehicle, a base, a single bolt securing said base to said pedal, a control pedal pivotally mounted upon said base, valve mechanism interposed between said base and said control pedal connected to both thereof for receiving operative movement therefrom during relative movement between said control pedal and said base, and a member pivotally mounted between its ends on said base and between said base and said control pedal, one end of said member bearing against said control pedal in spaced relation with respect to the pivotal axis thereof and the other end of said member being formed for connection to a power element 8. In combination with a control pedal for a motor vehicle, and having a pad on the free end thereof, a base overlying said pedal pad, a bolt projecting through said base and pedal pad securing said base to said pad and having a head above said base, a control pedal pivotally mounted on said base, valve mechanism interconnected between said control pedal and said base whereby to operate during relative movement of said control pedal relative to said base, and a double armed lever between said base and said control pedal pivotally mounted on said head of said bolt and having one end thereof bearing against said control pedal at a point spaced with respect to the pivotal axis of said control pedal, the opposite arm of said double armed lever being formed for connection to a pull member.

9. In combination with an actuating pedal of a motor vehicle, a base fixed to the outer end of said pedal, a control pedal pivotally mounted on said base, a valve mechanism interconnected between said base and said control pedal for actuation during relative movement therebetween, a member interposed between said base and said control pedal mounted intermediate its ends for pivotal movement, one end of said member bearing against said control pedal at a point thereon spaced from the pivotal axis of said control pedal, and means for connecting the opposite end of said member to a pull member.

10. In combination with a control pedal of a motor vehicle, a base fixed with respect to said pedal, a control pedal pivotally mounted upon said base, valve mechanism interposed between said base and said control pedal connected to both thereof for receiving operative movement therefrom during relative movement between said control pedal and said base, and means interposed between said base and said control pedal operable when moved in one direction to urge said control pedal away from said base, and means for connecting said member to a power element whereby the pull of said power element on said member tends to move said movable member in said direction to move said control pedal away from said base, said last mentioned means including a hollow piston rod for said power element forming a fluid passageway between said valve mechanism and said power element.

11. In a motor vehicle, in combination, a lever adapted to be actuated in the actuation of mechanism on said motor vehicle, a member movably mounted on said lever, control valve mechanism interconnected with said lever and member and adapted to be actuated upon relative movement between them, reaction means carried by and bodily movable with said lever operatively connected with said lever and said member, a fluid power element, a connection between said fluid power element and said reaction means, and means forming an operative connection between said valve mechanism and both said fluid power element and a source of power.

12. In a motor vehicle, in combination, a pivotally mounted lever connected to a part of said vehicle for actuation thereof upon movement of said lever, a fluid pressure power operated element secured to said vehicle, a source of power for said element, a member pivotally mounted on said lever and movable bodily therewith, a valve mechanism operatively connected to both said element and said source for controlling communication therebetween and operatively connected to both said lever and said pivoted member for operation by relative movement therebetween, and a reaction member operatively connected to both said lever and pivoted member and serving to transmit the force exerted by said element to said lever, the connections between said reaction member, lever and pivoted member being so constructed and arranged that said member is urged toward a position relative to said lever to close said valve by a force proportional to that exerted on said lever by said element.

GILBERT E. PORTER.